(12) United States Patent
Christmas

(10) Patent No.: US 11,640,138 B2
(45) Date of Patent: May 2, 2023

(54) LASER MODULATION

(71) Applicant: Dualitas Ltd, Knowlhill (GB)

(72) Inventor: Jamieson Christmas, Knowlhill (GB)

(73) Assignee: Dualitas Ltd, Milton Keynes (GB)

( * ) Notice: Subject to any disclaimer, the term of this patent is extended or adjusted under 35 U.S.C. 154(b) by 452 days.

(21) Appl. No.: 16/665,194

(22) Filed: Oct. 28, 2019

(65) Prior Publication Data
US 2020/0292990 A1 Sep. 17, 2020

(30) Foreign Application Priority Data

Mar. 15, 2019 (GB) ...................................... 1903533

(51) Int. Cl.
*G03H 1/22* (2006.01)
(52) U.S. Cl.
CPC ......... *G03H 1/2294* (2013.01); *G03H 1/2205* (2013.01); *G03H 1/2286* (2013.01); *G03H 2222/12* (2013.01); *G03H 2225/52* (2013.01)
(58) Field of Classification Search
CPC .. G03H 1/2294; G03H 1/2205; G03H 1/2286; G03H 1/0808; G03H 1/32;
(Continued)

(56) References Cited

U.S. PATENT DOCUMENTS 5,073,010 A * 12/1991 Johnson .................. G02F 1/135
349/28
8,654,048 B2 * 2/2014 Collings .............. G03H 1/2286
345/87
(Continued)

FOREIGN PATENT DOCUMENTS

CN 105579917 A 5/2016
GB 2482066 A * 1/2012 ........... G03H 1/2286
(Continued)

OTHER PUBLICATIONS

Depending U.S. Appl. No. 16/665,174, filed Oct. 28, 2019.
(Continued)

*Primary Examiner* — Jade R Chwasz
*Assistant Examiner* — Jyotsna V Dabbi
(74) *Attorney, Agent, or Firm* — McDonnell Boehnen Hulbert & Berghoff LLP

(57) ABSTRACT

A holographic image generation system including a spatial light modulator; a light source; a temporal modulator; a light sensor and a demodulator. The spatial light modulator has pixels. The light source illuminates the spatial light modulator. The temporal light modulator modulates an output intensity of the light source over time to encode holographic data representing a hologram. The light sensor is associated with a spatial light modulator and receives light from the light source and generates a signal representative of the output intensity of the light source. The demodulator is connected to the light sensor to receive the signal. The demodulator decodes the signal to obtain the holographic data. The demodulator is connected to the spatial light modulator to set the pixels of the spatial light modulator in accordance with the holographic data to display the hologram ready for illumination by the light source to form a holographic reconstruction.

19 Claims, 10 Drawing Sheets

(58) Field of Classification Search
CPC .. G03H 1/02; G03H 1/04; G03H 1/08; G03H 1/22; G03H 2001/0212; G03H 2001/0224; G03H 2001/0228; G03H 2001/0816; G03H 2001/2297; G03H 2001/0825; G03H 2001/0208; G03H 2001/0428; G03H 2001/2244; G03H 2222/12; G03H 2222/23; G03H 2222/33; G03H 2222/46; G03H 2222/34; G03H 2225/52; G03H 2225/00; G03H 2225/30–35; G03H 2225/12; G03H 2225/25; G03H 2226/04; G03H 2226/11; G02B 27/01; G02B 27/0101; G02B 27/0103; G02B 27/017; G02B 27/0172; G02B 2027/014; G02B 2027/0174; G02B 2027/0109; G02B 2027/0118; G02B 21/0032; G02B 6/12; G02B 2006/12142; G02B 2006/12138; G02B 2006/121212; G02F 1/13318; H04N 9/3161; H04N 9/3155; H04N 9/315; H04N 9/3152; H04N 9/312; H04N 5/7416; H04N 13/344
USPC .......................................................... 359/27
See application file for complete search history.

(56) References Cited

U.S. PATENT DOCUMENTS

| | | |
|---|---|---|
| 2013/0265622 A1 | 10/2013 | Christmas et al. |
| 2014/0022526 A1 | 1/2014 | Van Eijk et al. |
| 2014/0253987 A1 | 9/2014 | Christmas |
| 2016/0223986 A1* | 8/2016 | Archambeau ......... G06F 3/0482 |
| 2017/0082855 A1 | 3/2017 | Christmas et al. |
| 2017/0115627 A1 | 4/2017 | Christmas et al. |
| 2017/0363869 A1 | 12/2017 | Christmas et al. |
| 2018/0046138 A1 | 2/2018 | Christmas et al. |
| 2018/0120768 A1 | 5/2018 | Christmas |
| 2018/0188532 A1 | 7/2018 | Christmas et al. |
| 2018/0225896 A1 | 8/2018 | Daman |
| 2018/0267468 A1 | 9/2018 | Chen et al. |
| 2018/0373129 A1* | 12/2018 | Pertierra .............. G03B 21/005 |
| 2019/0041641 A1 | 2/2019 | Christmas et al. |
| 2019/0064738 A1 | 2/2019 | Cole et al. |

FOREIGN PATENT DOCUMENTS

| | | |
|---|---|---|
| GB | 2496108 A | 5/2013 |
| GB | 2526275 A | 11/2015 |
| GB | 2554575 A | 4/2018 |
| GB | 2559112 A | 8/2018 |
| GB | 2567409 A | 4/2019 |
| GB | 2567410 A | 4/2019 |
| GB | 2569206 A | 6/2019 |
| GB | 2569208 A | 6/2019 |
| GB | 2560490 A | 9/2019 |
| WO | 2015/032824 A1 | 3/2015 |
| WO | 2018078366 A1 | 5/2018 |
| WO | 2018100394 A1 | 6/2018 |
| WO | 2018100397 A1 | 6/2018 |

OTHER PUBLICATIONS

Copending U.S. Appl. No. 16/679,167, filed Nov. 9, 2019.
Search Report under Section 17, United Kingdom Patent Application GB1903533.6, dated Sep. 20, 2019.

* cited by examiner

FIGURE 4 – PRIOR ART

LASER MODULATION

CROSS-REFERENCE TO RELATED APPLICATIONS

This application claims the benefit of priority of United Kingdom Patent Application no. GB1903533.6, filed Mar. 15, 2019, which is hereby incorporated herein by reference in its entirety.

FIELD

The present disclosure relates to a system for laser modulation. More specifically, the present disclosure relates to an image generation system for delivering holographic data through laser modulation. Some aspects relate to a holographic projector or holographic projection system comprising the image generation system. Some aspects relate to a head-up display and a head-mounted display. Some aspects relate to a method of delivering holographic data through laser modulation.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel transform or Fourier transform. These types of holograms may be referred to as Fresnel or Fourier holograms. A Fourier hologram may be considered as a Fourier domain representation of the object or a frequency domain representation of the object. A CGH may also be calculated by coherent ray tracing or a point cloud technique, for example.

A CGH may be displayed, represented, or otherwise encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. not comprised of pixels) and light modulation may therefore be continuous across the device. The SLM may be reflective, meaning that modulated light is output from the SLM in reflection. The SLM may equally be transmissive, meaning that modulated light is output from the SLM is transmission.

A holographic projector for imaging may be provided using the described technology. Such projectors have found application in head-up displays, "HUD", and head-mounted displays, "HMD", including near-eye devices, for example.

Speckle is the consequence of using highly coherent light sources to form an image. In particular, speckle is the result of interference of many waves having the same frequency but different phases (and in some cases different amplitudes). The different phases cause the waves to interfere to give a resultant wave whose amplitude, and therefore intensity, varies randomly. It is desirable to reduce such speckle, since speckle degrades the quality of the image.

SUMMARY

Aspects of the present disclosure are defined in the appended independent claims.

There is provided a holographic image generation system comprising: a spatial light modulator; a light source; a temporal modulator; a light sensor and a demodulator. The spatial light modulator has pixels (or light-modulating elements). The light source is configured to illuminate the spatial light modulator (more specifically, illuminate the pixels of the spatial light modulator). The temporal light modulator is arranged to modulate an output intensity of the light source over time to encode holographic data representing a hologram. The light sensor is associated with the spatial light modulator. The light sensor is configured to receive light from the light source and generate a signal representative of the output intensity of the light source. The demodulator is connected to the light sensor to receive the signal. The demodulator is arranged to decode the signal to obtain the holographic data. The demodulator is further connected to the spatial light modulator to set the pixels of the spatial light modulator in accordance with the holographic data to display the hologram ready for illumination by the light source to form a holographic reconstruction.

The holographic data representing a hologram may comprise first data representing the hologram and second data representing a lens function and/or grating function. The first data and second data may be combined by addition. The first and second data may each comprise a plurality of phase-delay values. The hologram may be a Fourier hologram or Fresnel hologram. The first data may be frequency domain data—that is, the hologram may be said to be a frequency domain hologram. The frequency domain hologram comprises a spatial distribution of spatial frequencies. The hologram may be a phase hologram. The lens function may comprise a plurality of phase-delay values corresponding to a lens. The grating function may comprise a phase-ramp function such as a wrapped (e.g. modulo $2\pi$) phase-ramp function. In other embodiments, only the first data (that is, the data representing the hologram) is modulated onto the light output by the light source and the second data (that is, the data representing a lens and/or grating) is added to the first data at the SLM end (i.e. after the demodulation).

The holographic image generation system can be integrated within another device, for example the system can be integrated with a holographic projector, or a head-up display for use in a vehicle.

The holographic image generation system can facilitate the provision of holographic data to the spatial light modulator, or SLM, without the need for direct electrical connections. Instead, holographic data can be delivered to the SLM optically by the same light source used to form a holographic reconstruction of the hologram represented by the holographic data. In particular, the light source can be modulated with the holographic data at the same time as the SLM is illuminated by the light source. In this way, the holographic data can be provided to the SLM without the need for physical/wired/cabled electrical or physical/wired/cabled optical connections (such as optical fibres). This can facilitate the provision of simpler and more efficient system since losses can be reduced.

In some embodiments, the holographic data is representative of a subsequent frame of a video and the temporal modulator is configured to modulate the output intensity to encode the holographic data representative of the subsequent frame while the light source illuminates the spatial light modulator set with holographic data of a current frame of the video to reconstruct the current frame of the video, wherein the subsequent frame is subsequent the current frame. In other words, the system operates to encode data for one frame in a sequence of frames whilst reconstructing a previous frame in the sequence. For example, the holographic data can be representative of an $(n+1)^{th}$ frame of a video (or sequence of frames) and the temporal modulator can be arranged to encode this holographic data for the $(n+1)^{th}$ frame whilst the light source illuminates the SLM to form a holographic reconstruction of an $n^{th}$ frame of the video, the SLM being set with holographic data representative of the $n^{th}$ frame. In this way, the current, or $n^{th}$, frame of a sequence of frames can be holographically reconstructed whilst holographic data for the subsequent $(n+1)^{th}$ frame in the sequence of frames is being encoded and provided to the SLM. In some embodiments, the holographic data representative of the current and subsequent frames is identical and is representative of the same image.

In some embodiments, the system further comprises a memory configured to store the decoded holographic data. For example, the memory can be configured to store the decoded holographic data of the subsequent frame whilst the pixels of the SLM are set in accordance with the holographic data of the current frame. The memory can be configured to store decoded holographic data representative of one frame, or of more than one frame.

In any of the above described embodiments, the temporal modulator is arranged to modulate the output intensity of the light source for the entire duration of time for which the light source is arranged to illuminate the spatial light modulator. Alternatively, the temporal modulator is arranged to modulate the output intensity of the light source for a portion of the duration of time for which the light source is arranged to illuminate the spatial light modulator. In other words, the SLM is illuminated for a set period of time (for example, a period of time equivalent to the frame length of the frame being holographically reconstructed), but the light source may only be modulated by the temporal modulator for a fraction or a portion of that time.

In some embodiments, the light sensor associated with the SLM is provided on the SLM. Optionally, in some embodiments, the SLM has a regular arrangement of pixel locations at which the pixels are located and the light sensor is provided at one of these pixel locations. This arrangement can improve the optical efficiency and compactness of the system, since illumination of any area outside of the pixel area of the SLM with the light source results in a loss of efficiency.

Optionally, the temporal modulator forms part of the light source. In some embodiments, the light source is a laser source comprising a laser diode and the temporal modulator comprises a control circuit for the laser diode. In this way the laser is directly modulated, which can improve the optical efficiency of the system. In other embodiments, the temporal modulator comprises an external optical modulator arranged within the path of the light source arranged to illuminate the SLM, for example, an optical modulator arranged between the light source and the SLM. The temporal modulator can comprise the control circuit for the laser diode and/or the external optical modulator, in addition to any other suitable components for modulating the output intensity of the light source.

Optionally, the demodulator connected to the light sensor forms part of the light sensor. For example, the demodulator and light sensor form a single integrated component. Alternatively, the demodulator may be integrated into a driver for the spatial light modulator.

Optionally, the light sensor is arranged to detect when the light source is off (and therefore not illuminating the SLM), the light sensor being further arranged to generate a signal indicating that the light source is off, the signal acting as a trigger for the demodulator to set the pixels of the spatial light modulator in accordance with the holographic data.

Optionally, the holographic image generation system further comprises a hologram calculation engine. The hologram calculation engine is arranged to calculate or generate the hologram and holographic data.

Optionally, a controller is coupled to the light source and provides a control signal to the light source. Alternatively or additionally, the controller is coupled to the temporal modulator and provides a control signal to the temporal modulator. For example, when the light source is a laser, the controller may provide a control signal to the laser diode control circuit of the laser. The control signal indicates a period of time for which the light source should be driven to correctly reconstruct the hologram represented by the holographic data. The control signal can indicate a different period of time for each frame of a video, for example. The control signal can control the light source and/or the temporal modulator on a frame by frame basis.

Optionally, the controller can be coupled to the light source, the spatial light modulator and a hologram calculation engine. The controller may comprise a clock which produces timing signals. The controller may be configured to provide the timing signals to the light source, spatial light modulator and hologram calculation engine in order to synchronise these components.

Optionally, the controller can also be coupled to a memory, the memory configured to select, store or receive information representative of an image to be holographically reconstructed. In this way, information provided to the hologram calculation engine is synchronised with the calculation or generation of the holograms by the hologram calculation engine to ensure the correct holographic data is provided to the spatial light modulator for the holographic reconstruction.

In a different configuration, the temporal modulator is arranged to modulate the light from the light source with the source image data. In this different configuration, the hologram is determined (e.g. calculated or retrieved from memory) at the SLM end.

Optionally, the hologram calculation engine can provide a control signal to the temporal modulator and/or the light source to synchronise the components, rather than the controller. The control signal can control the light source and/or the temporal modulator on a frame by frame basis.

Optionally, the spatial light modulator is a liquid crystal on silicon spatial light modulator. Optionally, the spatial light modulator is an optically addressed SLM. Preferably, the SLM is arranged to spatially-modulate the phase and/or the amplitude of the light of the input beam. Optionally, the holographic reconstruction is formed by interference of the spatially modulated light.

In some embodiments, the hologram provided to the SLM to be displayed or represented on the SLM is a computer generated hologram. In other words, the hologram has been computed by a hologram calculation engine, rather than merely stored within a memory or displayed or represented on the SLM. Optionally, when the hologram is a computer generated hologram, the computer generated hologram is a mathematical transformation of the holographic reconstruction. Optionally, when the hologram is a computer generated hologram a memory may be provided to store the holographic data representing the hologram. Optionally, the computer generated hologram is a Fourier transformation or a Fresnel transformation of the holographic reconstruction. Optionally, the computer generated hologram is a Fourier hologram or a Fresnel hologram. Optionally, the computer generated hologram is generated by a point cloud method.

There is also provided a method of setting pixels of a spatial light modulator an SLM to represent a hologram, the method comprising: illuminating a spatial light modulator having pixels with light; modulating an intensity of the light while illuminating the spatial light modulator to encode holographic data representing a hologram; sensing the modulated intensity of the light and decoding the modulated intensity to obtain the holographic data; setting the pixels of the spatial light modulator in accordance with the obtained holographic data; and subsequent to setting the spatial light modulator, further illuminating the spatial light modulator with light to form a holographic reconstruction of the hologram.

Optionally, the step of sensing comprises sensing at the spatial light modulator, or SLM. In some embodiments, the SLM has a regular arrangement of pixel locations at which the pixels are located and the step of sensing comprises sensing with a light sensor provided at one of the pixel locations.

Optionally, the light is emitted by a laser and modulating comprising modulating an output intensity of the laser. This modulation can be direct or indirect. In direct modulation, the output intensity of the laser can be directly modulated, for example by controlling a control circuit of a laser diode of the laser. Alternatively, the modulation can be indirect, for example with an external modulator such as an optical modulator.

Optionally, the step of illuminating and the step of further illuminating are performed with the same light source. In some embodiments, the SLM can be repeatedly illuminated to obtain the holographic data representative of a hologram encoded within the light source and then further illuminated to form the holographic reconstruction of said hologram. This enables the formation of a sequence of holographic reconstructions. Optionally, the sequence of holographic reconstructions is equal to a sequence of frames defining a holographically reconstructed video.

In some embodiments, the step of illuminating forms an $n^{th}$ frame of the sequence of frames and the step of further illuminating forms an $(n+1)^{th}$ frame of the sequence of frames. In particular, the holographic data is representative of a subsequent frame of the video and the steps of illuminating and modulating comprise illuminating the spatial light modulator and modulating the intensity of the light to encode the holographic data representative of the subsequent, $(n+1)^{th}$, frame while the spatial light modulator is set according to holographic data representative of a current, $n^{th}$, frame of the video, wherein the subsequent frame is subsequent to the current frame.

The method may further comprise further modulating the intensity of the light while further illuminating the spatial light modulator to encode holographic data representative of a further subsequent frame, subsequent to the subsequent frame. Optionally, the current, subsequent and further subsequent frames directly follow each other. By providing the holographic data for the subsequent frame whilst holographically reconstructing the current frame, and similarly by providing holographic data for the further subsequent frame whilst holographically reconstructing the subsequent frame, the holographic data can be efficiently and effectively provided to the SLM without affecting the reconstruction of the video. In other words, the current frame is reconstructed and the holographic data for the next frame is transmitted during the step of illuminating, and the next frame is reconstructed during the step of further illuminating.

Optionally, the method further comprises switching off the light source between the steps of illuminating and further illuminating, the method comprising setting the pixels of the spatial light modulator in accordance with the obtained holographic data whilst the light source is switched off. In this way, the spatial light modulator is illuminated for a first period (in which the holographic data is transmitted) and then illuminated for a second period (in which the holographic reconstruction represented by the transmitted data is reconstructed), where the first period is subsequent to the second period. During a third period between the first and second periods the light source is switched off and the pixels set with the holographic data transmitted during the first period to enable the holographic reconstruction during the third period.

The method may further comprise a method of implementing any of the above described features of the holographic image generation system, as well as the alternative embodiments described herein.

Any of the above described optional embodiments can be combined in any suitable combination. Moreover, although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

The terms "setting", "encoding", "writing" or "addressing" are used to describe the process of providing the plurality of pixels of the SLM with a respect plurality of control values which respectively determine the modulation level of each pixel. It may be said that the pixels of the SLM are configured to "display" or "represent" a light modulation distribution in response to receiving the plurality of control values.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography. The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

BRIEF DESCRIPTION OF THE DRAWINGS

Specific embodiments are described by way of example only with reference to the following figures.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
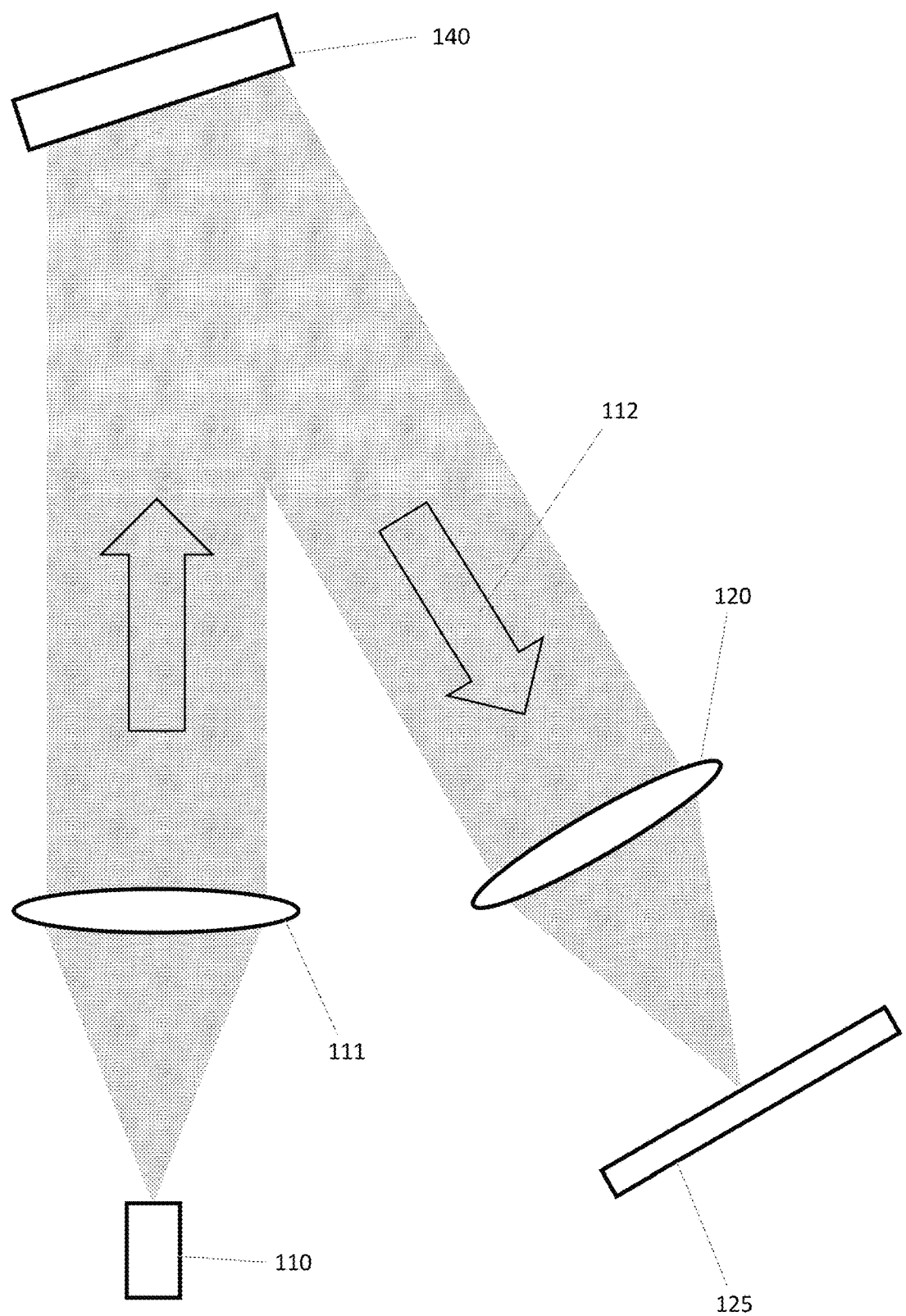
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
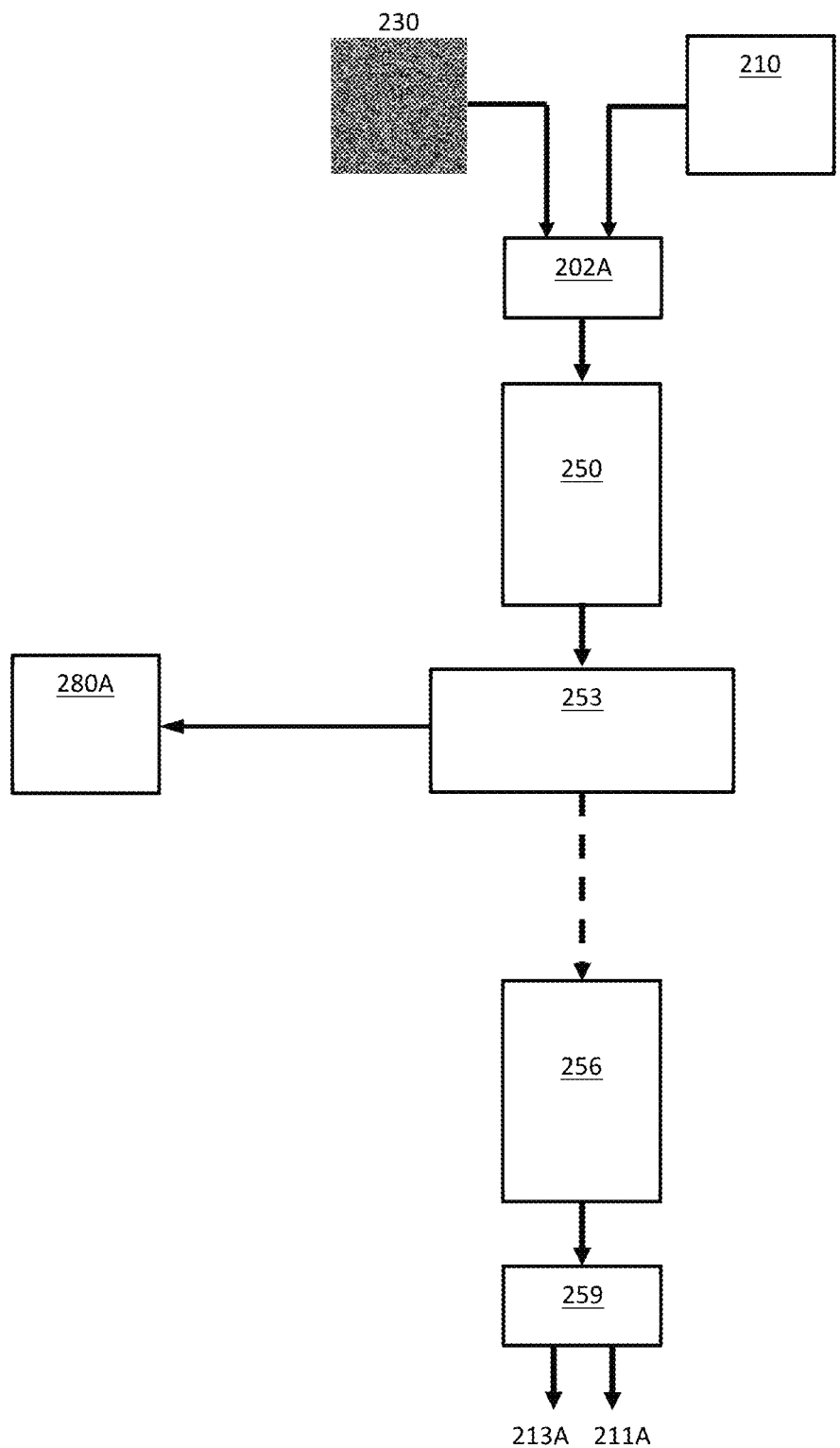
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and extracts the set of phase values. The second processing block 253 quantises each phase value to form hologram 280A. Each phase value is quantised in accordance with the phase-levels which may be represented on the pixels of the spatial light modulator which will be used to "display" the hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments). If the algorithm continues, second processing block 253 additionally replaces the magnitude values of the Fourier transformed complex data set with new magnitude values. The new magnitude values are a distribution of values representative of the magnitude distribution of the light pattern which will be used to illuminate the spatial light modulator. In some embodiments, each new magnitude value is unity. In other embodiments, second processing block 253 processes the magnitude values of the second complex data set—for example, performs a mathematical operation or series of mathematical operations on each magnitude value—to form the new magnitude values. Second processing block 253 outputs a complex data set comprising the quantised phase values and the new magnitude values.

Third processing block 256 receives the complex data set output by the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and assesses the distribution of magnitude values 211A. Specifically, the fourth processing block 259 compares the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 determines that the hologram 280A is acceptable. That is, if the difference between the distribution of magnitude values 211A and the input image 210 is sufficiently small, the fourth processing block 259 determines that the hologram 280A is a sufficiently-accurate representative of the input image 210. In some embodiments, the distribution of phase values 213A of the inverse Fourier transformed complex data set is ignored for the purpose of the comparison.

It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm is performed.

Figure 2B:
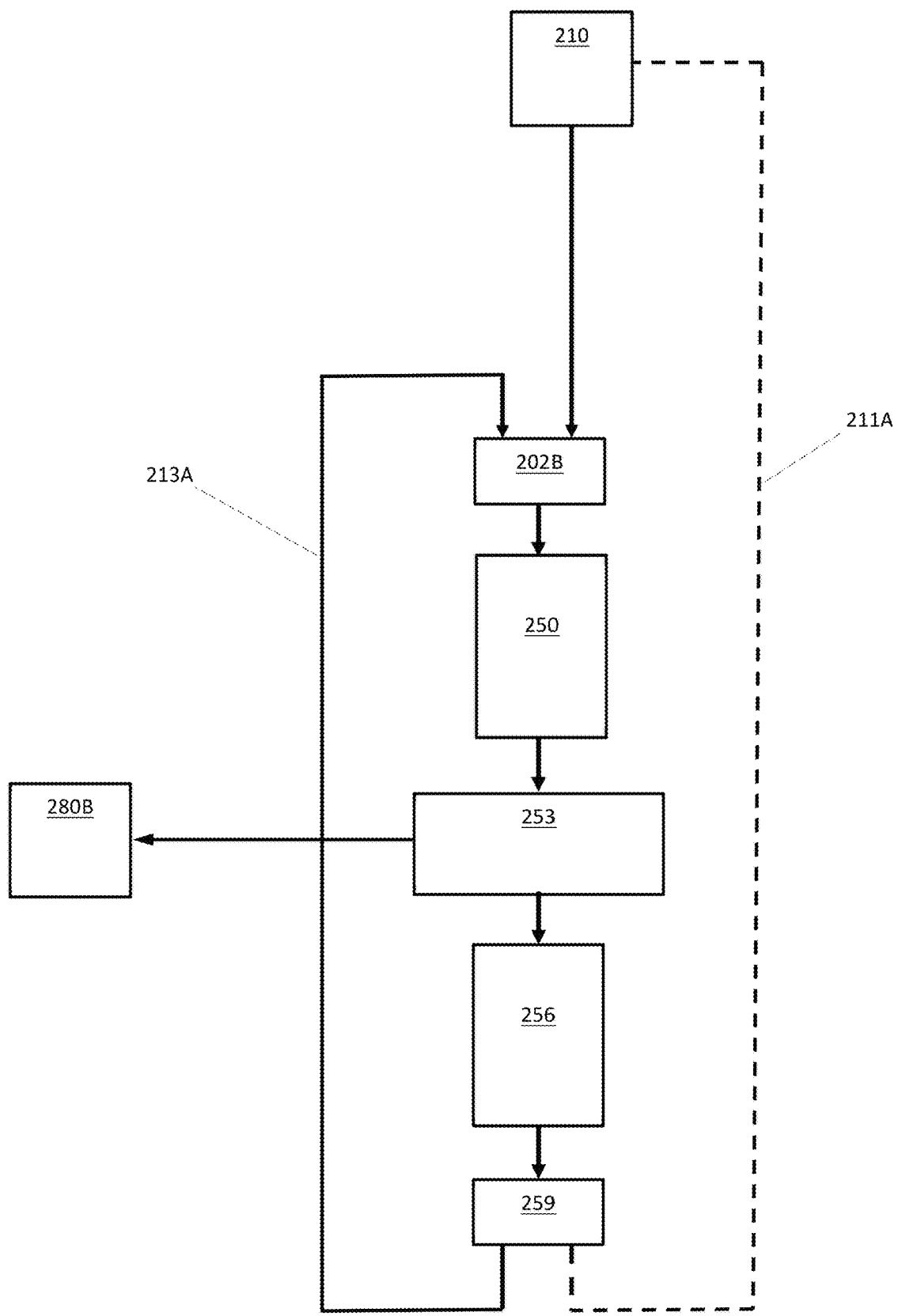
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
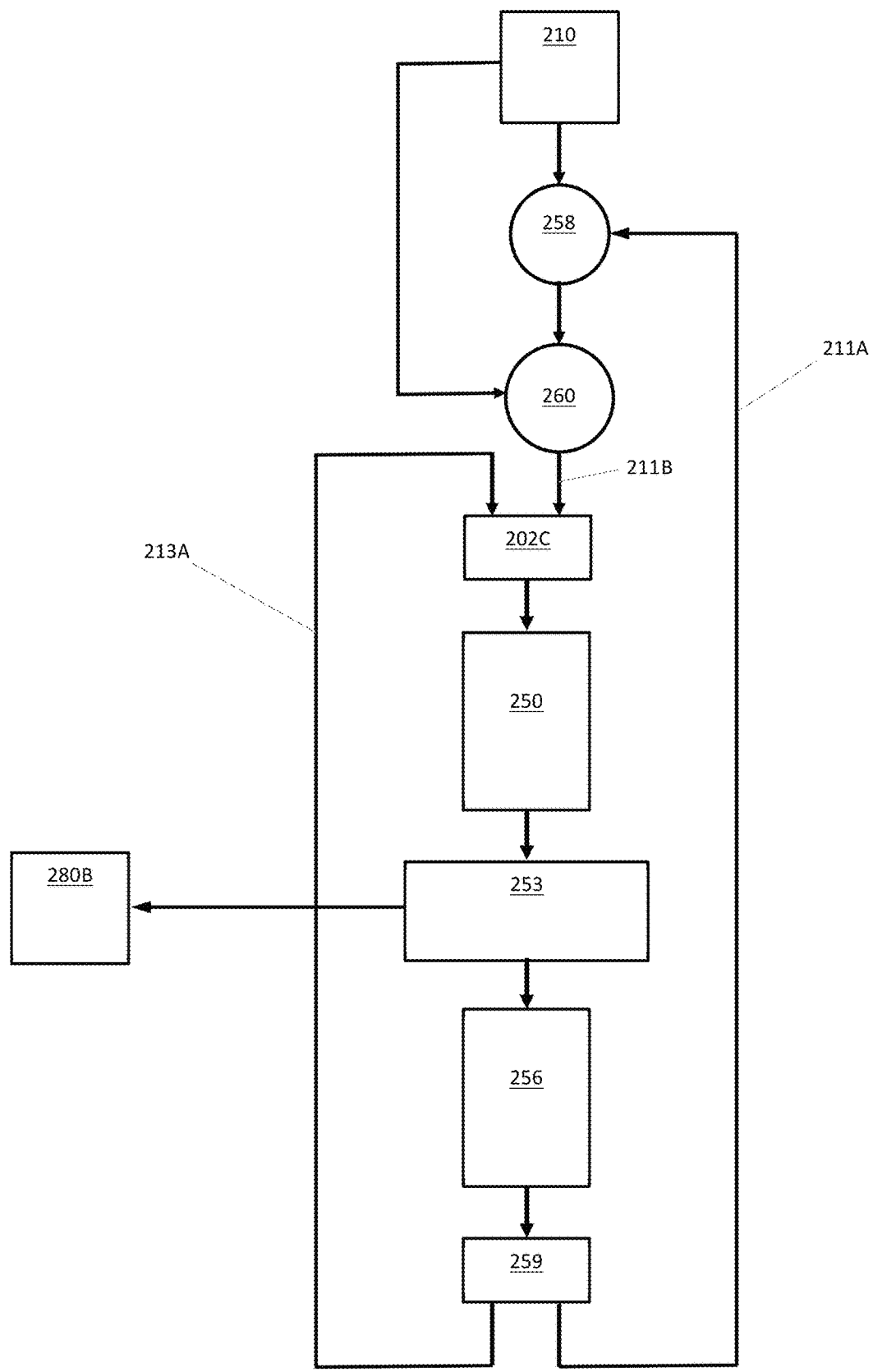
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y] = F'\{\exp(i\psi_n[u,v])\}$$

$$\psi_n[u,v] = \angle F\{\eta \cdot \exp(i\angle R_n[x,y])\}$$

$$\eta = T[x,y] - \alpha(|R_n[x,y]| - T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number. The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, It is known in the field of computer-generated hologram how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
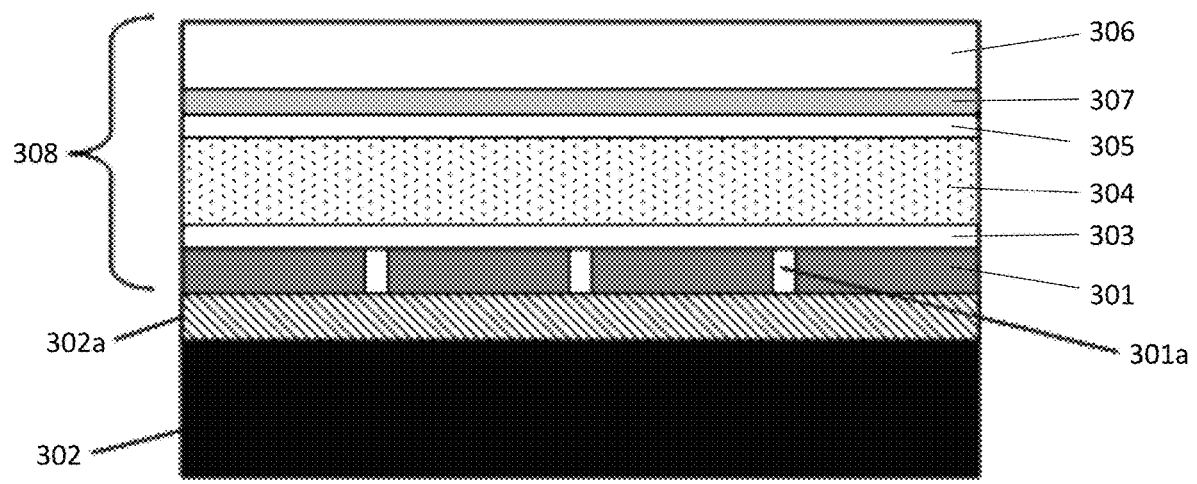
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the liquid crystal layer 304 and a planar transparent layer 306, e.g. of glass, is disposed on the second alignment layer 305. A single transparent electrode 307 e.g. of ITO is disposed between the transparent layer 306 and the second alignment layer 305. Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Holographic Image Generation System

Figure 4:
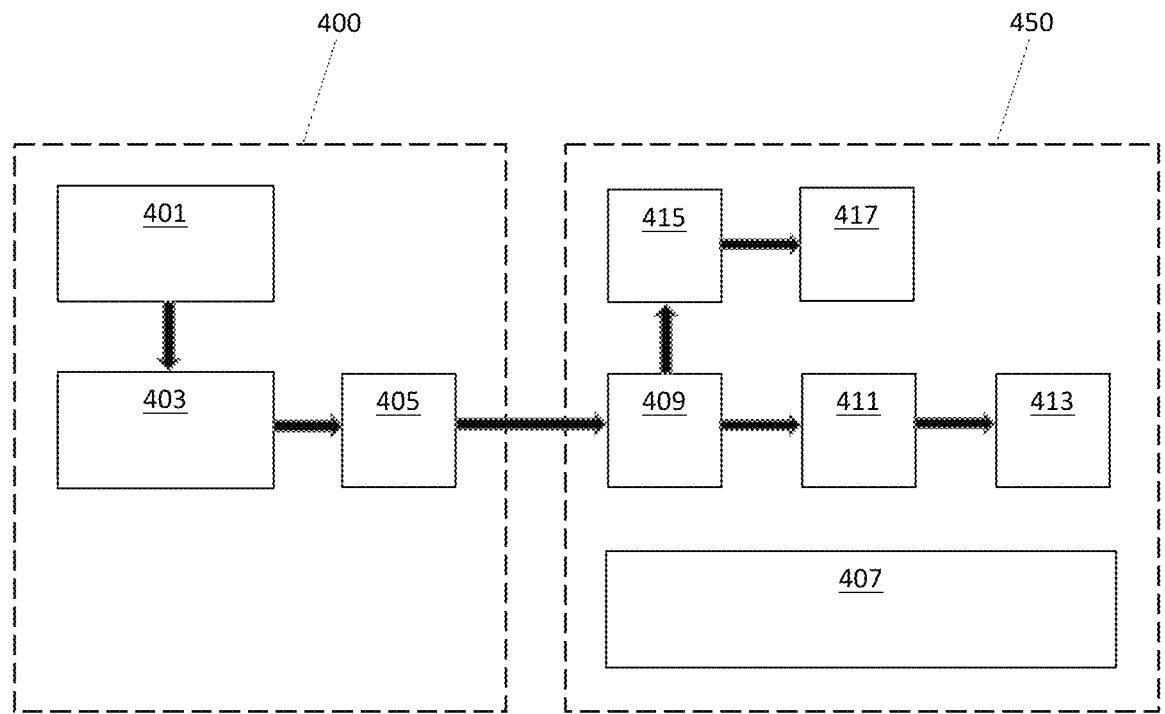
FIG. 4 shows a schematic of a conventional holographic projector.

A conventional holographic projector in accordance with the prior art is described with reference to FIG. 4. A computer system 400 is arranged to comprise a memory or input for storing or receiving a video 401 comprising frames. The video 401 may alternatively comprise rendered graphics from a graphics processing unit (GPU), for example. The GPU may be contained within the computer system 400. The video 401 is passed to a hologram calculation engine 403 which generates or calculates a series of computer generated holograms (CGH) representative of the individual frames of the video 401. The computer generated holograms, or holographic data representative of the computer generated holograms, are then sent to a video driver 405 within the computer system 400, which video driver 405 converts the holographic data into a format compliant with a video protocol or standard for subsequent transmission to a projection system 450. For example, the holographic data may be converted to the HDMI (High-Definition Multimedia Interface) format for transmission. Alternatively, the holographic data may be converted into any other suitable format for transmission to the projection system 450. The signal representative of the holographic data, for example an HDMI signal, is then transmitted to the projection system 450.

The signal representative of the holograms is received by a video input 409 of the projection system 450 and sent to a driver 411 of the spatial light modulator, or SLM, 413. The driver 411 converts the HDMI signal into the correct signal format for the driver 411 to set the pixels of the SLM 413 in accordance with the received holographic data for subsequent holographic reconstruction of the original video. In this arrangement, the driver 411 receives the holographic data from the video input 409 as an electrical signal. The hologram calculation engine 403, video driver 405, video input 409 and SLM driver 411 may all be implemented on a field programmable gate array (FPGA).

As described above, in this example the holographic data is representative of a series of frames of the video 401 to be holographically reconstructed. For a given frame of the original video, the driver 411 sets the pixels of the SLM 413 in accordance with the holographic data for that frame (as received electrically from the video input 409), such that the hologram represented by the holographic data is displayed on the pixels of the SLM. The SLM is then illuminated with the laser to produce a holographic reconstruction of that frame. The holographic reconstruction, once formed, can be projected by optical system 407. By repeating this process, a holographic reconstruction of a video can be formed.

To correctly produce the holographic reconstruction the light emitted from the laser must be synchronised with the driving signals for the SLM to ensure that the SLM is illuminated by the laser only once the hologram is correctly displayed on the SLM 413 (i.e. the pixels are correctly set). To achieve this synchronisation, a laser driver 415 of the projection system 450 receives a signal from the FPGA (or from the video input 409 when the components are not implemented on an FPGA). The laser driver 415 controls a laser diode 417 of a laser in accordance with the signal to synchronise the light emitted from the laser with the holographic data displayed on the SLM. In other words, the laser diode 417 and SLM 413 are both controlled based on synchronising signals received from the video input 409 or FPGA.

In this conventional holographic projector described with reference to FIG. 4, the laser driver 415 "gates" the laser in accordance with the signal from the FPGA. In other words, the laser emits light whilst the signal is present, and stops emitting light when the gate signal is removed. For example, the laser driver 415 controls the laser diode 417 of the laser to not emit light for a first period, and then emit light for a second period. Preventing the laser from emitting light in this way allows pixels of the SLM 413 to be correctly set to display the holographic data received from the video input 409 before any illumination by the laser. For example, when the pixels are formed from liquid crystals, gating the laser provides sufficient time for the liquid crystals to orientate themselves to correctly display the holographic data representative of the current frame before the pixels of the SLM 413 are illuminated to form the holographic reconstruction of the frame.

Figure 5:
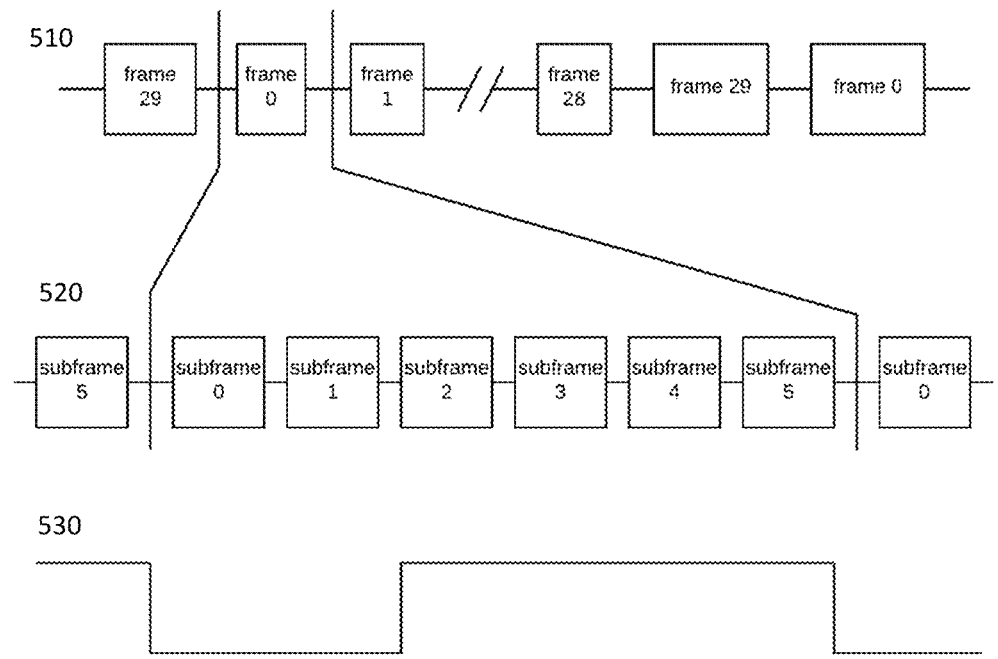
FIG. 5 shows an example of timings for the conventional holographic projector of FIG. 4.

In both the above-described conventional holographic projector and in embodiments of the present holographic image generation system (described below), each frame to be reconstructed may be divided into sub frames—the laser is then controlled to be off for the first sub frame and on for the remaining sub frames of the frame, for example. These timings are described further with reference to FIG. 5, in which HDMI frames 510 are representative of frames of the original video to be holographically reconstructed. For example, frame 0 of frames 510 corresponds to a single frame of the original video. Holographic data representative of this single video frame will be represented on the SLM 413 for the duration of frame 0, and the SLM 413 is illuminated by the laser during that period in order to form the holographic reconstruction. In this example, frame 0 of frames 510 is divided into six subframes 520. The laser gating signal is shown as signal 530 and it can be seen that laser gating signal 530 is arranged such that the laser does not emit any light during the first two subframes (subframe 0 and subframe 1) of frame 0. It is during this period of frame 0 that the pixels of the SLM are correctly set. The laser gating signal 530 controls the laser driver 415 to then emit light for the next four subframes of frame 0 (subframes 2 to 5) in order to illuminate the SLM 413 and form a holographic reconstruction of the original video frame. If the frame rate is sufficiently high, the human eye cannot perceive that the laser does not emit light for a third of the period of frame 0.

Figure 6:
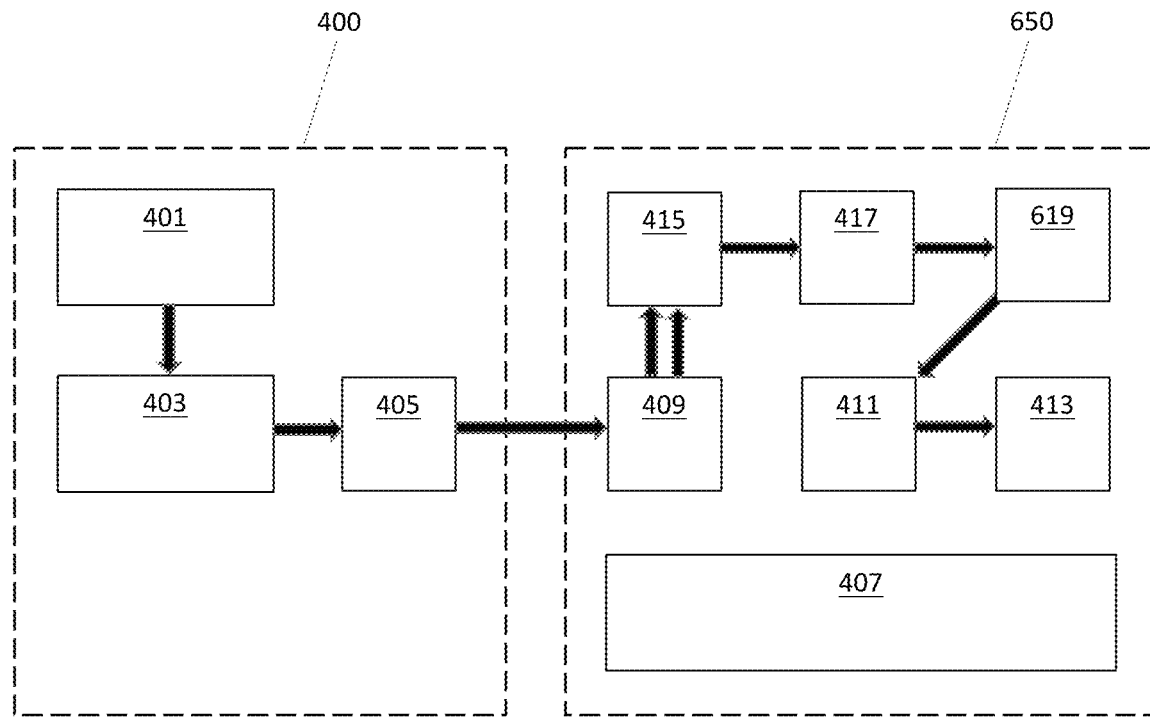
FIG. 6 shows a holographic projector comprising a holographic image generation system in accordance with embodiments.

With reference to FIG. 6, an embodiment of the holographic image generation system integrated within a holographic projector 650 is described. Unlike the conventional projector described with reference to FIG. 4, there is no electrical connection to transmit the holographic data from the video input 409 to the SLM 413. Instead, the holographic data is transmitted to the SLM optically and without any wired connections between the video input and the SLM (i.e. with no optical fibres or similar connections). Instead, after conversion of the holographic data by video driver 405 into a format compliant with a video standard for subsequent transmission to a projection system 450, the electrical signal representative of the holographic data is transmitted from the video input 409 to the laser driver 415 only and the holographic data is then transmitted optically to the SLM, by modulation of the laser light in time, as described below.

In this embodiment, the laser driver 415 not only controls the laser diode 417 to cause the laser to illuminate the spatial light modulator, but also controls the laser diode 417 to modulate an output intensity of the laser in order to encode the holographic data received from the video input 409 at the same time as the laser illuminates the SLM 413. The control circuit, or driver 415, of the laser diode thus acts as a part of the temporal modulator. This temporal modulation encodes the holographic data within the laser light and provides the holographic information to the SLM 413 optically, removing the need for wired connections between the SLM system and the rest of the holographic projector 650. This arrangement can reduce constraints on the positioning of the SLM relative to some other components of the system 650, since wired, direct electrical, connections are not needed.

In this embodiment, the modulation of the laser light is direct, amplitude only, modulation of the drive signal of the laser diode 417 in order to control the intensity of the laser output. However, the intensity of the laser could be temporally modulated in other ways. The modulation of the intensity can be achieved through manipulation of the amplitude, phase, or phase and amplitude. For example, quadrature amplitude modulation can be used to encode the holographic data. In other embodiments, the modulation can be performed by, for example, an electro-optical or other optical modulator placed in the optical path of the laser and controlled to temporally modulate an intensity or polarisation of the light. In some embodiments, the temporal modulation can comprise both direct and indirect elements; for example, the intensity of the laser can be directly controlled and then an external optical modulator can be placed between the laser and the SLM to provide additional modulation of the light.

The holographic image generation system described with reference to FIG. 6 comprises a light sensor and a demodulator. The light sensor 619 is associated with the SLM 413 and is configured to receive the modulated light from the laser and generate a signal representative of the intensity of the laser. This generated signal is received by the demodulator 619, which decodes the signal to obtain the holographic data originally encoded within the laser by the temporal modulator 415. The light sensor and demodulator can be one integrated component 619 or can be separate components connected to one another.

The holographic data contained within the decoded signal is passed by the demodulator to the SLM driver 411. In this way, the demodulator is connected to the SLM to set the pixels of the SLM in accordance with the decoded holographic data. In particular, the optically-delivered holographic data is received at the light sensor 619 as a progressive scan (row-by-row) and buffered by the SLM driver 411 until the start of the next frame. At the start of the next frame, the holographic data is sent to the SLM 413 and the pixels of the SLM 413 are set with the holographic data whilst the laser is off. For example, the light sensor associated with the SLM may be arranged to trigger the writing of the holographic data to the SLM (or the setting of the SLM pixels in accordance with the holographic data) based on a detection that the laser has been turned off.

The SLM driver 411 is arranged to ensure that the pixels of the SLM 413 are set with the correct holographic data in the time period whilst the laser is off, so that the holographic data is correctly displayed before the laser is switched back on for illumination of the SLM 413 and encoding of the holographic data for the next frame. This process is an on-going streaming process which operates at a fixed clock speed, i.e. there is a fixed time interval between the windows in which the laser is driven to emit light. Synchronisation between the SLM and the laser can be provided by the turning on and off, or gating, of the laser being detected by the light sensor. In particular, the signal generated by the light sensor 619, which is representative of the intensity of the laser, will indicate whether the light is on or off. This generated signal is received by the demodulator 619, which decodes the signal to determine whether the laser is off. The demodulator is arranged to trigger writing of the holographic data to the SLM 413 based on the signal.

There is a minimum time period that the laser must be off for, i.e. the time required to write the holographic data to the pixels of the SLM. However, the laser can be off for a longer period of time. In this arrangement, if the laser is arranged to be on for a longer period of time than is required to reconstruct the current frame any unwanted light energy from the laser can be diverted from the holographic reconstruction to other parts of the replay field (for example, an image noise border).

In other arrangements a controller can be connected, directly or indirectly, to the laser driver 415. The controller can be part of computer system 400. The controller can provide a control signal to the laser driver 415, which control signal provides information to the laser driver 415 regarding a period of time for which the laser driver 415 should drive the laser diode 417 in order to achieve the desired holographic reconstruction. The controller can also be connected to the SLM driver 411 and arranged to provide control signals to the driver 411 in order to drive the SLM 413 to set the pixels with the holographic data during the window where the laser is off, as described above.

The controller optionally comprises a clock which produces timing signals. The controller can be coupled to the laser driver 415 and the SLM driver 411, and configured to provide the timing signals to the laser driver 415 and SLM driver 411 to synchronise these different components to the central clock of the controller. In some embodiments, the controller is also coupled to the hologram calculation engine 403 and provides control signals to the hologram calculation engine 403 to ensure that the correct holographic data is provided from the hologram calculation engine 403 to the SLM driver 411.

The length of time for the laser emits light during each frame can be determined on a frame-by-frame basis, based on the required image brightness. The synchronising information can therefore be continuously provided by the timing signals or other control signals from the controller, or based on the signal representative of the intensity of light generated by the light sensor 619, which acts as a trigger for the SLM driver 411 to write the holographic data to the SLM. Where there is a fixed time interval between the windows in which the laser is driven to emit light, each component can also operate independently of the others based on the fixed time interval (once synchronised). As before, the synchronisation can be provided by the turning on and off, or gating, of the laser being detected by the light sensor and triggering the writing of the holographic data to the SLM 413. In this arrangement, if the laser is arranged to be on for a longer period of time than is required to reconstruct the current frame, any unwanted light energy from the laser can be diverted from the holographic reconstruction to other parts of the replay field (for example, an image noise border).

In some embodiments, the demodulator and driver 411 are separate components. In other embodiments, the demodulator and driver 411 are integrated components. As described above with reference to FIG. 4, the driver 411 is arranged to set the pixels of the SLM in accordance with the holographic data in order to display the hologram represented by the holographic data. When the SLM 413 is illuminated by the laser, the hologram displayed on the SLM 413 causes interference in the light and a holographic reconstruction of the hologram is formed at a replay field spatially separate from the SLM.

In order to transmit holographic data to the SLM 413 optically and without physical connections in an efficient manner, in this embodiment the holographic data for a given frame is encoded and transmitted during the holographic reconstruction of a previous frame of a sequence of frames. To achieve this the temporal modulator is arranged to modulate an output intensity of the light source over time to encode holographic data representing a hologram, where the holographic data is representative of a subsequent frame of a video, or sequence of frames. At the same time, the light source illuminates the spatial light modulator, the pixels of which are set with holographic data of a current frame of the video. In this manner, the current frame of the video is holographically reconstructed whilst the holographic data representative of the subsequent frame of the video, the subsequent frame being subsequent to the current frame, is transmitted to the SLM.

The temporal modulator modulates an output intensity of the light source, in this example a laser, to encode the holographic data representative of a subsequent, or $(n+1)^{th}$, frame of a video (or sequence of frames). This modulation occurs over time such that the SLM is illuminated by the laser whilst the modulation is occurring. The light sensor receives the laser light encoded with the holographic data and generates a signal representative of the intensity of the laser. The demodulator receives the signal from the light sensor and decodes the signal to obtain the holographic data. This signal is provided to the SLM driver 411, which is arranged to set the pixels of the SLM 413 in accordance with the holographic data. This setting of the pixels occurs whilst the laser is off. The SLM is illuminated by the laser to reconstruct a frame at the same time as the holographic data for the next frame is being encoded within the laser light and transmitted from the laser to the light sensor. The laser is then switched off and the pixels of the spatial light modulator set with the holographic data before the laser is switched back on ready for further illumination of the SLM by the laser for the next frame.

For example, when the hologram is representative of a video or sequence of frames and the temporal modulator is arranged to encode the holographic data for the $(n+1)^{th}$ frame, the pixels of the SLM are set with holographic data representative of an $n^{th}$ frame of the sequence of frames. During this step of illumination of the SLM during which the temporal modulator is encoding the holographic data within the laser light, a holographic reconstruction is formed of the $n^{th}$ frame. In other words, the system operates to encode data for one frame in a sequence of frames whilst reconstructing a previous frame in the sequence. In this manner, holographic data is efficiently provided to the SLM.

Alternatively, in some embodiments only one image is to be reconstructed (rather than a sequence of video frames) and the holographic data is provided to the SLM by the laser before a hologram is displayed on the SLM. Whilst there is not a holographic reconstruction formed for display to a user at this time, there can still be light present in the replay field, for example in the form of an image noise border. This means there is a light signal which can be modulated with holographic data even when there is not main image being formed, enabling transmission of the encoded holographic data to the SLM. The pixels of the SLM can then be set in accordance with the holographic data ready for illumination of the SLM by the light source to form a holographic reconstruction of the original image represented by the holographic data. In this situation, the holographic reconstruction displayed on the SLM may not change—the laser may still be off, or gated, but the SLM pixels are simply refreshed to display the same holographic data during this gating period, rather than re-set to display different decoded holographic data.

Evidently, the holographic data can only be encoded and transmitted when the laser is on and emitting light; this leaves a defined window of time during each frame where the holographic data for the next frame can be encoded. The laser needs to be modulated at the rate of Gbits/second in order to optically deliver the required holographic data within two subframes, for example. For example, for a hologram of 512×512 pixels, where each pixel is 7-bit and the frame rate is 60 frames per second, the data transmission rate is 110 Mbits/second. For a larger hologram, a higher rate of data transmission is required. Such rates of modulation can be achieved with conventional high-speed laser driver hardware, for example hardware designed for laser scanning projectors, but the modulation is too fast for the human eye to perceive the changes in intensity, and thus does not affect the resulting holographic reconstruction in a perceptible manner. The light sensor, which is associated with the SLM in such a way that it receives the laser light which is arranged to illuminate the SLM, and may in some embodiments be located on the SLM, has a sensing rate sufficiently high to detect this fast rate of modulation and thus to enable the holographic data encoded within the laser light to be obtained after transmission. This sensing rate can be achieved with conventional hardware.

Figure 7:
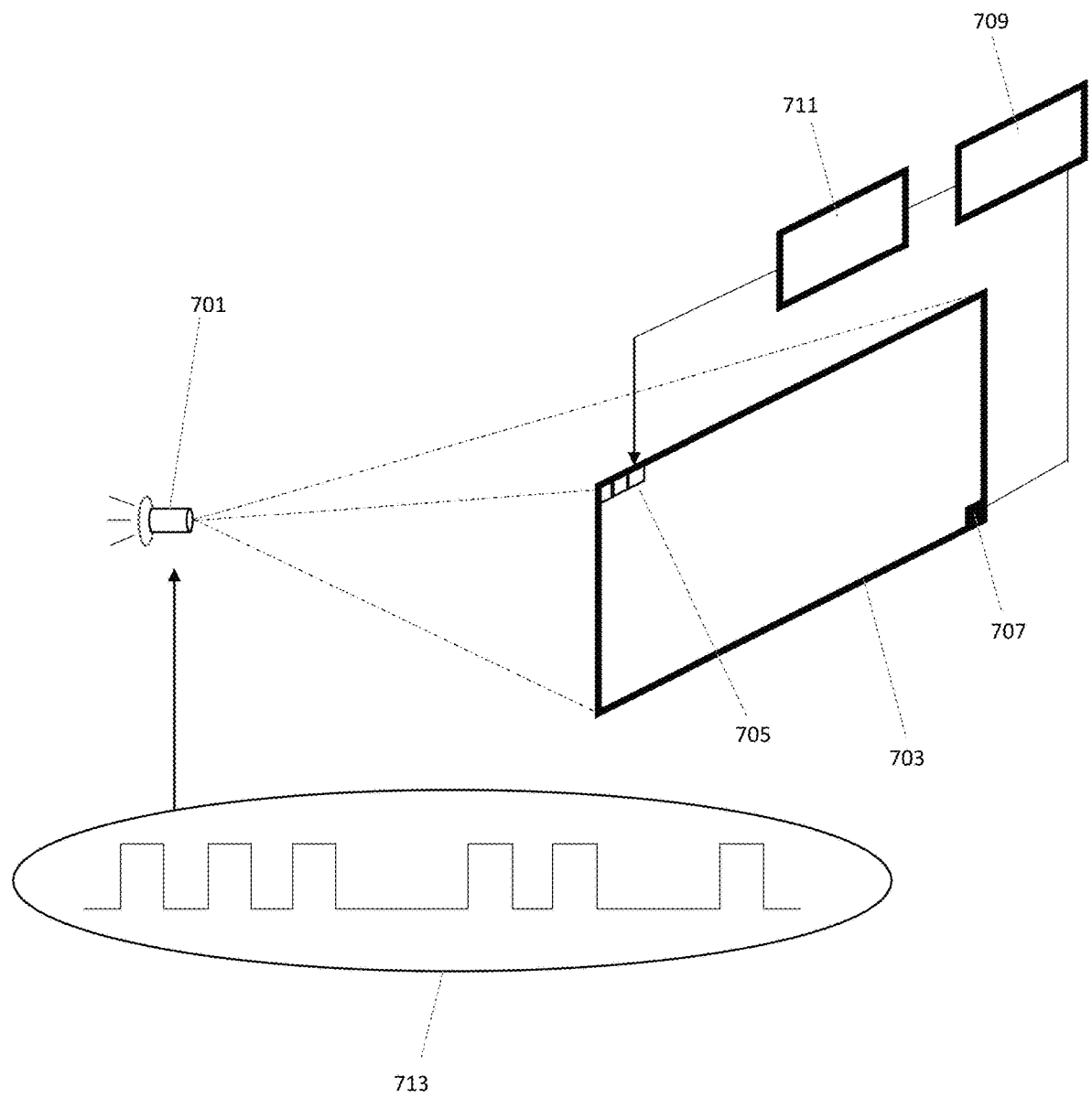
FIG. 7 shows a schematic representation of a holographic projector comprising a holographic image generation system in accordance with embodiments.

The holographic image generation system is described further with reference to FIG. 7. A drive signal 713 is provided to a laser diode 701 of a laser in order to drive the laser to output light. The drive signal 713 is modulated in order to encode the laser light with holographic data representative of a hologram; when the modulated drive signal 713 is provided to the laser diode 701, the drive signal 713 drives the laser diode to increase or decrease the output intensity laser light in accordance with the amplitude of the drive signal 713. The drive signal 713 shown in FIG. 7 encodes the holographic data by way of binary modulation of the amplitude of the laser output. Binary modulation is shown for the purposes of simplicity only, and any other suitable form of modulation which modulates the amplitude and/or phase of the laser could be used (for example, quadrature amplitude modulation could be used). The drive signal 713 can be a separate signal from the gating signal which gates the laser, or the driver signal 713 can include the gating signal such that the drive signal 713 both gates the laser (for example, for two subframes), drives the laser at a predetermined output intensity (for example, for another two subframes), and then modulates the output intensity of the laser (for example, for the final two subframes).

The modulated laser light containing the holographic data is received by an SLM 703 containing pixels 705. A light sensor 707 is provided on the SLM 703. In some embodiments, the SLM has a specific, for example a regular, arrangement of pixel locations at which the pixels 705 are located and the light sensor 707 is provided at one of the pixel locations. The light sensor 707 receives the laser light (which has been amplitude modulated in accordance with the drive signal 713 to change the output intensity) and generates a signal representative of the output intensity of the laser. A demodulator 709 is connected to the light sensor to receive the signal representative of the output intensity of the laser and to decode the signal to obtain the holographic data encoded within the laser light. The demodulator 709 then provides the holographic data to an SLM driver 711 to set the pixels of the SLM 703 in accordance with the holographic data. As described above, the pixels of the SLM 703 are advantageously set whilst the laser is off or gated, ready for subsequent illumination of the SLM 703 by the laser and the subsequent holographic reconstruction of the hologram displayed by the pixels once an illumination signal is applied to the laser by the laser diode 701.

As well as providing a simpler and more efficient holographic image generation, the system described above with respect to FIGS. 6 and 7 can advantageously reduce the occurrence of speckle in a holographic reconstruction.

Firstly, it is known that the centre wavelength of light emitted by a laser is a function of the temperature of the laser because the temperature change causes physical changes to the laser cavity (i.e. changes in the cavity length). For example, the centre wavelength can increase linearly with the temperature; for a 100 mW laser, a change of 100 degrees Celsius in temperature can result in a change of 5.5 nm in the centre wavelength. If a laser is pulsed on and off, the temperature fluctuates and thus the centre wavelength fluctuates. This fluctuation in the centre wavelength reduces interference between the different waves, since the waves have different wavelengths, and therefore speckle in the resulting holographic reconstruction is reduced. This temperature fluctuation can be controlled to some extent by adjusting the length of time for which the laser is on, and the exact point within a frame at which the laser is turned on or off. Since excess light energy can be removed from the image, the period during which the laser is on can be increased without increasing the brightness of the holographic reconstruction. In this way, the above arrangement can be used to help control the factors which influence speckle and can therefore facilitate improvements in speckle reduction.

Secondly, using a pulsed laser blurs the perceived effect of speckle, as described below. For a given voltage the "director" of a liquid crystal pixel (a dimensionless unit vector which represents the temporal and spatial average of the long axis of the liquid crystals within the pixel, or the average direction of the preferred orientations of the liquid crystals) is found to vary with time—in other words the director is unstable. This is found to be the case particularly with devices with a digital backplane (e.g. an Liquid Crystal on Silicon, LCOS, SLM), since the liquid crystals respond to the root mean squared of the applied electrical field and there is no capacitor in such devices to maintain a steady electric field.

Illuminating the SLM with a pulsed laser therefore effectively samples slightly different angles of the director, n. The pulsed laser effectively samples different, instantaneous, director orientations, and it has been found that sampling the director in this manner reduces speckle (as compared to continuous wave laser modulation, for example). This is because changes in the director angle results in slight variations in the phase pattern (hologram) and therefore slight variations in the image (holographic reconstruction) and resulting speckle pattern, which blur the perceived effect of the speckle. In particular, Moreover, because the laser is pulsed, the change in sampled director orientation between samplings is discontinuous, so these variations in the speckle pattern are step changes; it has been found that such step changes have more of an impact on reducing the perceived speckle than gradual variations in the speckle pattern.

Figure 8:
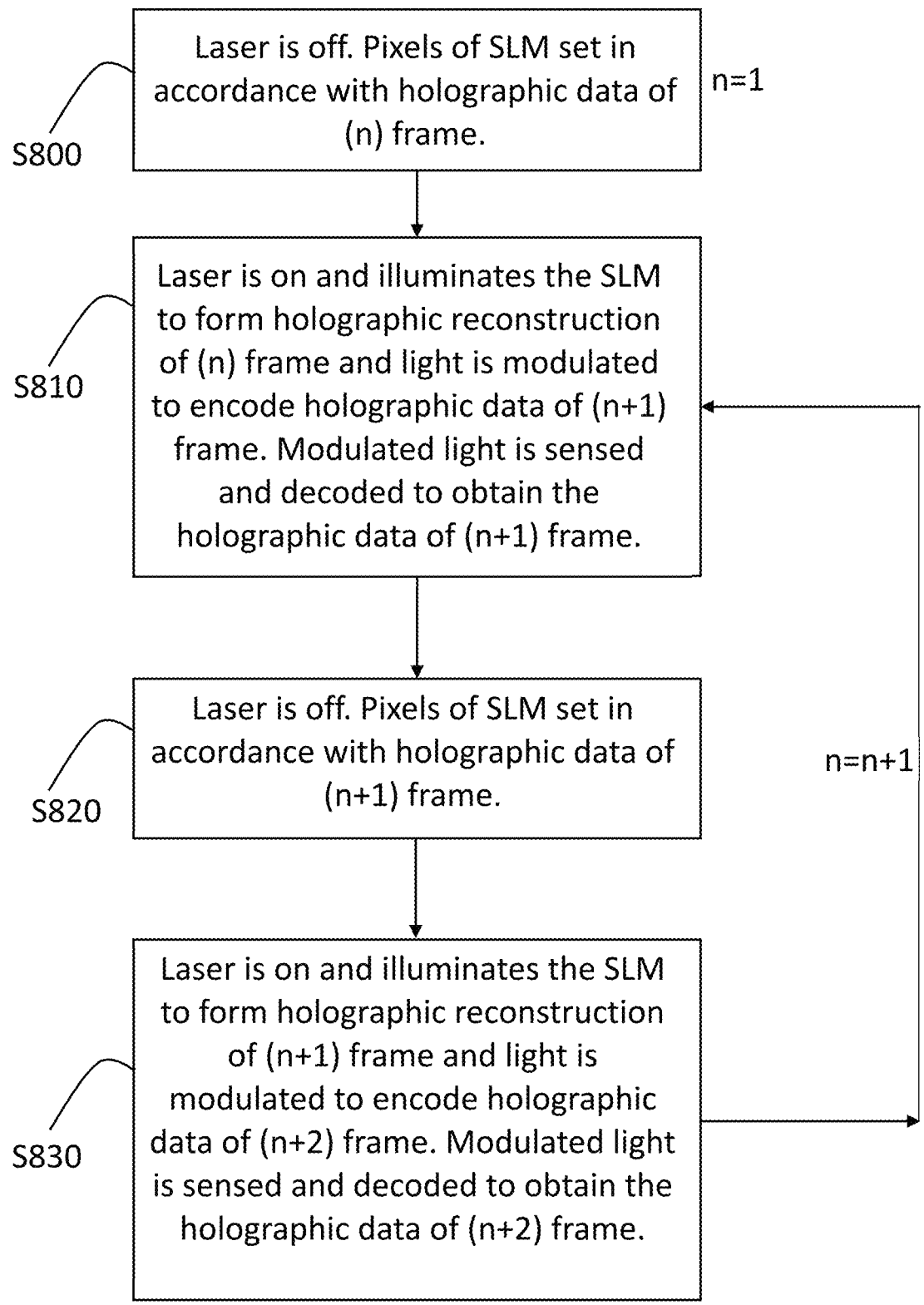
FIG. 8 illustrates a method of setting pixels of an SLM in accordance with embodiments.

A method of setting pixels of an SLM to represent a hologram is described with reference to FIG. 8. At step S800, the laser is off and the pixels of the SLM are set with a hologram representative of an $(n)^{th}$ frame of a sequence of frames of a video, where n=1.

At step S810, the laser is switched on to illuminate the SLM and the laser is encoded with holographic data representative of the $(n+1)^{th}$ frame (the step of illuminating). As the laser illuminates the SLM, a holographic reconstruction of the $(n)^{th}$ frame is formed. An intensity of the light used to illuminate the SLM is at the same time modulated to encode holographic data representing a hologram, as is described above with reference to FIGS. 6 and 7. The light sensor associated with the SLM receives the modulated laser light and the modulated intensity of the light is sensed and decoded to obtain the holographic data representative of the $(n+1)^{th}$ frame. This step of decoding can occur at any suitable time within step S810. For example, encoding of the holographic data by modulation of the laser light can occur for the entire duration of step S810, and the subsequent decoding can occur simultaneously. Alternatively, the encoding of the holographic data can occur for only a first portion of step S810 and the decoding can occur during a second portion of step S810 subsequent to the first portion. During the whole of step S810, the laser is on and illuminating the SLM to form the holographic reconstruction of the $(n)^{th}$ frame.

At step S820, the laser is switched off. In some embodiments, the SLM driver 411 is arranged to detect if the signal from the light sensor is indicative of the laser being off (i.e. that the SLM 413 is not illuminated by the laser). This detection by the SLM driver 411 triggers the SLM driver to provide the holographic data to the SLM, so that the pixels of the SLM are set in accordance with the hologram representative of the $(n+1)^{th}$ frame received during step S810. of a sequence of frames of a video. S830 is functionally a repeat of step S810, except that when the laser is switched on to illuminate the SLM (the step of further illuminating), the laser is encoded with holographic data representative of the $(n+2)^{th}$ frame. As the laser illuminates the SLM, a holographic reconstruction of the $(n+1)^{th}$ frame is formed, since the pixels were set with the holographic data representative of the $(n+1)^{th}$ frame during step S820. At the end of step S830, n is set to n=n+1. Steps S810 to S830 are repeated whilst n is less than the number of frames in a sequence of frames, at which point the process ends.

By providing the holographic data for the next frame whilst holographically reconstructing the current frame, the holographic data can be efficiently and effectively provided to the SLM without affecting the overall reconstruction of the video, as discussed above.

Additional Features

Embodiments refer to an optically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

In some embodiments, the size (number of pixels in each direction) of the hologram to be reconstructed is equal to the size of the spatial light modulator so that the hologram fills the spatial light modulator. That is, the hologram uses all the pixels of the spatial light modulator. In other embodiments, the size of the hologram to be reconstructed is less than the size of the spatial light modulator. Therefore, to fill the SLM part of the hologram is repeated in the unused pixels. This technique may be referred to as tiling, wherein the surface area of the spatial light modulator is divided up into a number of tiles, each of which represents at least a subset of the hologram. Each tile is therefore of a smaller size than the spatial light modulator.

The size of the holographic replay field (i.e. the physical or spatial extent of the holographic reconstruction) is determined by the pixel spacing of the spatial light modulator (i.e. the distance between adjacent light-modulating elements, or pixels, of the spatial light modulator). The smallest feature which may be formed in the replay field may be called a "resolution element", "image spot" or an "image pixel". Typically, each pixel of the spatial light modulator has a quadrangular shape, optionally, a rectangular or square shape. The Fourier transform of a quadrangular aperture is a sinc function and therefore each image pixel is a sinc function. More specifically, the spatial intensity distribution of each image pixel on the replay field is a sinc function. Each sinc function may be considered as comprising a peak-intensity primary diffractive order and a series of decreasing-intensity higher diffractive orders extending radially away from the primary order. The size of each sinc function (i.e the physical or spatial extent of each sinc function) is determined by the size of the spatial light modulator (i.e. the physical or spatial extent of the aperture formed by the array of light-modulating elements or spatial light modulator pixels). Specifically, the larger the aperture formed by the array of light-modulating pixels, the smaller the image pixels.

It is usually desirable to have small image pixels. It is also usual in display technology to want the maximum number of image pixels possible. However, degradation of image quality can occur if the density of image pixels in the replay field is too high. This degradation is due to interference between the various orders of adjacent sinc functions and results in, for example, a decrease in the signal-to-noise ratio of the holographic reconstruction. There is therefore a balance to be struck with the number of image pixels. In other words, there is an optimum number of image pixels or optimum range for the number of image pixels. It has been found that tiling an input hologram onto an output hologram can reduce such image degradation and increase image quality. Specifically, some embodiments implement the technique of tiling to minimise the size of the image pixels whilst maximising the amount of signal content going into the holographic reconstruction.

However, the resulting holographic reconstruction can still suffer from "speckle" if a coherent light source, such as a laser, is used. Speckle is well-known and is the result of interference of light scattered off an optically rough surface.

The quality of the holographic reconstruction may also be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

The holographic reconstruction is created within the zeroth diffraction order of the overall window defined by the spatial light modulator. It is preferred that the first and subsequent orders are displaced far enough so as not to overlap with the image and so that they may be blocked using a spatial filter.

In embodiments, the holographic reconstruction is in colour. In examples disclosed herein, three different colour light sources and three corresponding SLMs are used to provide composite colour. These examples may be referred to as spatially-separated colour, "SSC". In a variation encompassed by the present disclosure, the different holograms for each colour are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast enough rate such that a human viewer sees a polychromatic image from a combination of the images formed by three lasers. Each hologram is therefore colour specific. For example, in a video at 25 frames per second, the first frame would be produced by firing the red laser for 1/75th of a second, then the green laser would be fired for 1/75th of a second, and finally the blue laser would be fired for 1/75th of a second. The next frame is then produced, starting with the red laser, and so on.

An advantage of FSC method is that the whole SLM is used for each colour. This means that the quality of the three colour images produced will not be compromised because all pixels on the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496,108 which is hereby incorporated in its entirety by reference.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A holographic image generation system comprising:
   a spatial light modulator having pixels;
   a light source configured to illuminate the spatial light modulator;
   a temporal modulator arranged to modulate an output intensity of the light source over time to encode light from the light source with holographic data representing a hologram at the same time that the spatial light modulator is illuminated by the light from the light source;
   a light sensor associated with the spatial light modulator and configured to receive, from the light source, the light which is arranged to illuminate the spatial light modulator and generate a signal representative of the output intensity of the light source;
   a demodulator connected to the light sensor to receive the signal and decode the signal to obtain the holographic data and connected to the spatial light modulator to set the pixels of the spatial light modulator in accordance with the holographic data to display the hologram ready for illumination by the light source to form a holographic reconstruction,
   wherein the holographic data is representative of a subsequent frame of a video and the temporal modulator is configured to modulate the output intensity to encode the light from the light source with the holographic data representative of the subsequent frame while the light from the light source illuminates the spatial light modulator set with holographic data of a current frame of the video to reconstruct the current frame of the video, wherein the subsequent frame is subsequent the current frame.

2. The system of claim 1, further comprising a memory configured to store the decoded holographic data for the subsequent frame.

3. The system of claim 1, wherein the light sensor is provided on the spatial light modulator.

4. The system of claim 1, wherein the spatial light modulator has a regular arrangement of pixel locations at which the pixels are located and wherein the light sensor is provided at one of the pixel locations.

5. The system of claim 1, wherein the light source comprises a laser.

6. The system of claim 5, wherein the laser comprises a laser diode and wherein the temporal modulator comprises a control circuit for the laser diode.

7. The system of claim 1, wherein the temporal modulator comprises an optical modulator arranged between the light source and the spatial light modulator for modulating an intensity of light output from the light source.

8. The system of claim 1, wherein the demodulator is arranged to set pixels of the spatial light modulator in accordance with the holographic data when the signal representative of the output intensity of the light source indicates the light source is off.

9. A method of setting pixels of a spatial light modulator to represent a hologram, the method comprising:
   illuminating the spatial light modulator having pixels with light;
   modulating an intensity of the light while illuminating the spatial light modulator to encode holographic data representing a hologram;
   sensing the modulated intensity of the light and decoding the modulated intensity to obtain the holographic data;
   setting the pixels of the spatial light modulator in accordance with the obtained holographic data;
   subsequent to setting the pixels of the spatial light modulator, further illuminating the spatial light modulator with light to form a holographic reconstruction of the hologram, wherein the sequence of holographic reconstructions is equal to a sequence of frames defining a holographically reconstructed video and wherein the holographic data is representative of a subsequent frame of the video; and
   illuminating the spatial light modulator and modulating the intensity of the light to encode the holographic data representative of the subsequent frame while the spatial light modulator is set according to holographic data representative of a current frame of the video, wherein the subsequent frame is subsequent the current frame.

10. The method of claim 9, wherein sensing comprises sensing at the spatial light modulator.

11. The method of claim 9, wherein the step of illuminating and the step of further illuminating is performed with the same light source.

12. The method of claim 9, further comprising repeatedly illuminating and further illuminating the spatial light modulator to form a sequence of holographic reconstructions.

13. The method of claim 9, the method further comprising further modulating the intensity of the light while further illuminating the spatial light modulator to encode holographic data representative of a further subsequent frame, subsequent to the subsequent frame.

14. The method of claim 13, wherein the current, subsequent and further subsequent frames directly follow each other.

15. The method of claim 9, wherein the spatial light modulator has a regular arrangement of pixel locations at which the pixels are located and wherein sensing comprises sensing with a light sensor provided at one of the pixel locations.

16. The method of claim 9, wherein the light is emitted by a laser.

17. The method of claim 16, wherein modulating comprising modulating an output intensity of the laser.

18. The method of claim 9, further comprising switching off the light source between the steps of illuminating and further illuminating, the method comprising setting the pixels of the spatial light modulator in accordance with the obtained holographic data whilst the light source is switched off.

19. The method of 9, further comprising:
   setting the pixels of the spatial light modulator in accordance with the obtained holographic data when the sensed modulated intensity of the light indicates that the spatial light modulator is not illuminated.

* * * * *